United States Patent
Shimizu et al.

(10) Patent No.: US 10,109,261 B2
(45) Date of Patent: Oct. 23, 2018

(54) INFORMATION DISPLAY CONTROL SYSTEM AND METHOD OF MAPPING ELEMENTAL IMAGES INTO A TEXTURE ATLAS

(71) Applicant: MITSUBISHI ELECTRIC CORPORATION, Tokyo (JP)

(72) Inventors: Takeshi Shimizu, Tokyo (JP); Yukio Goto, Tokyo (JP); Shogo Yoneyama, Tokyo (JP); Haruhiko Wakayanagi, Tokyo (JP); Tetsuro Akaba, Tokyo (JP); Natsumi Ishiguro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/329,734

(22) PCT Filed: Sep. 22, 2014

(86) PCT No.: PCT/JP2014/075114
§ 371 (c)(1),
(2) Date: Jan. 27, 2017

(87) PCT Pub. No.: WO2016/046890
PCT Pub. Date: Mar. 31, 2016

(65) Prior Publication Data
US 2017/0221458 A1    Aug. 3, 2017

(51) Int. Cl.
G09G 5/397      (2006.01)
G09G 5/14       (2006.01)

(52) U.S. Cl.
CPC .............. *G09G 5/397* (2013.01); *G09G 5/14* (2013.01); *G09G 2340/0471* (2013.01); *G09G 2340/0478* (2013.01)

(58) Field of Classification Search
None
See application file for complete search history.

(56) References Cited

U.S. PATENT DOCUMENTS 8,994,727 B2    3/2015  Tomaru
2005/0104880 A1*  5/2005  Kawahara ........... G06F 3/04815
                                              345/419

(Continued)

FOREIGN PATENT DOCUMENTS

JP    2013-206094 A    10/2013
WO    WO 2012/063279 A1    5/2012
WO    WO 2013/111195 A1    8/2013

OTHER PUBLICATIONS

3D CG & Character Create Kaizokuya, "Low Poly Modeling 2nd edition 1st edition", 1st edition, Shuwa System Co., Ltd., Dec. 25, 2008 (Dec. 25, 2008), pp. 111 to 122.

(Continued)

*Primary Examiner* — Michael J Cobb
(74) *Attorney, Agent, or Firm* — Birch, Stewart, Kolasch & Birch, LLP

(57) ABSTRACT

An information display controller is capable of switching a plurality of screens and allowing a display to display the plurality of screens thereon, and includes a screen constructor, a texture atlas storage unit and a texture atlas creator. The texture atlas creator creates a texture atlas, in which elemental images as constituents of the plurality of screens are arranged, in accordance with an algorithm that takes sizes of the elemental images as references. The texture atlas storage unit stores the texture atlas created by the texture atlas creator. The screen constructor constructs the plurality of screens by using the elemental images extracted from the texture atlas stored in the texture atlas storage unit. In an event of creating the texture atlas, the texture atlas creator preferentially incorporates, into the texture atlas, an elemen- (Continued)

tal image for composing the screen including more elemental images already arranged in the texture atlas.

7 Claims, 15 Drawing Sheets

(56) References Cited

U.S. PATENT DOCUMENTS

| | | | |
|---|---|---|---|
| 2007/0109580 A1* | 5/2007 | Yoshida | G06F 3/0482 358/1.13 |
| 2012/0232988 A1* | 9/2012 | Yang | G06Q 30/02 705/14.49 |
| 2013/0063463 A1 | 3/2013 | Clark et al. | |
| 2013/0067502 A1* | 3/2013 | Blanco | G06F 3/14 719/328 |
| 2013/0120401 A1* | 5/2013 | Borysenko | G06T 13/80 345/473 |
| 2013/0120402 A1* | 5/2013 | Adams | G06F 9/44 345/473 |
| 2013/0176307 A1* | 7/2013 | Tomaru | G06T 15/04 345/420 |
| 2014/0267346 A1* | 9/2014 | Ren | G06T 15/04 345/582 |
| 2014/0270537 A1* | 9/2014 | Lo | G06T 11/60 382/195 |
| 2014/0354629 A1* | 12/2014 | Adlers | G06T 3/60 345/419 |
| 2015/0123968 A1* | 5/2015 | Holverda | G06K 9/4604 345/422 |
| 2015/0235392 A1 | 8/2015 | Sakurai et al. | |
| 2015/0348280 A1* | 12/2015 | Oriol | G06T 7/40 345/582 |

OTHER PUBLICATIONS

Burk, E. K., G. Kendall, and G. Whitwell "A New Placement Heuristic for the Orthogonal Stock-Cutting Problem", Operations Research, 52, (2004), pp. 655-671.

* cited by examiner

F I G. 1
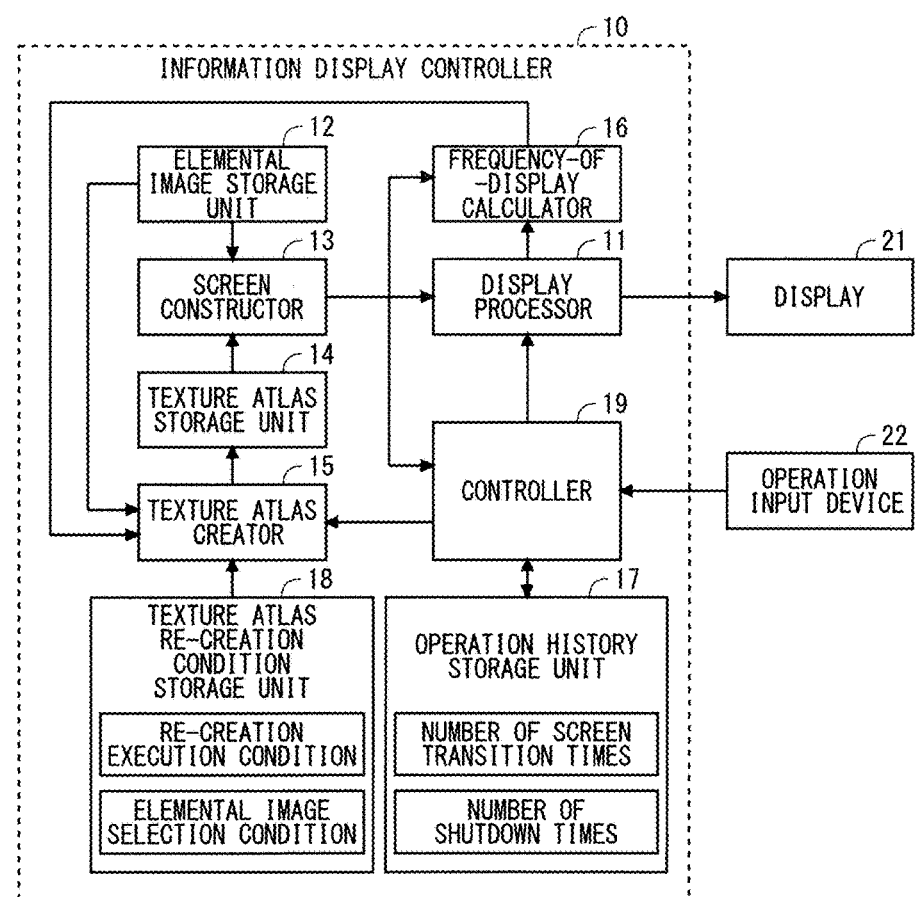

F I G . 7

| NUMBER | NAME OF IMAGE | WIDTH | HEIGHT | USING SCREEN | HORIZONTAL SYMMETRY | VERTICAL SYMMETRY |
|---|---|---|---|---|---|---|
| 1 | A | 800 | 480 | SC1 | | |
| 2 | B | 224 | 224 | SC1 | | |
| 3 | C | 224 | 400 | SC1 | | |
| 4 | D | 800 | 120 | SC2 | G | |
| 5 | E | 800 | 120 | SC2 | | |
| 6 | F | 800 | 120 | SC2 | | |
| 7 | G | 800 | 120 | SC2 | D | |
| 8 | H | 800 | 320 | SC3 | | |
| 9 | I | 800 | 120 | SC3 | | |
| 10 | J | 224 | 224 | SC3 | | |

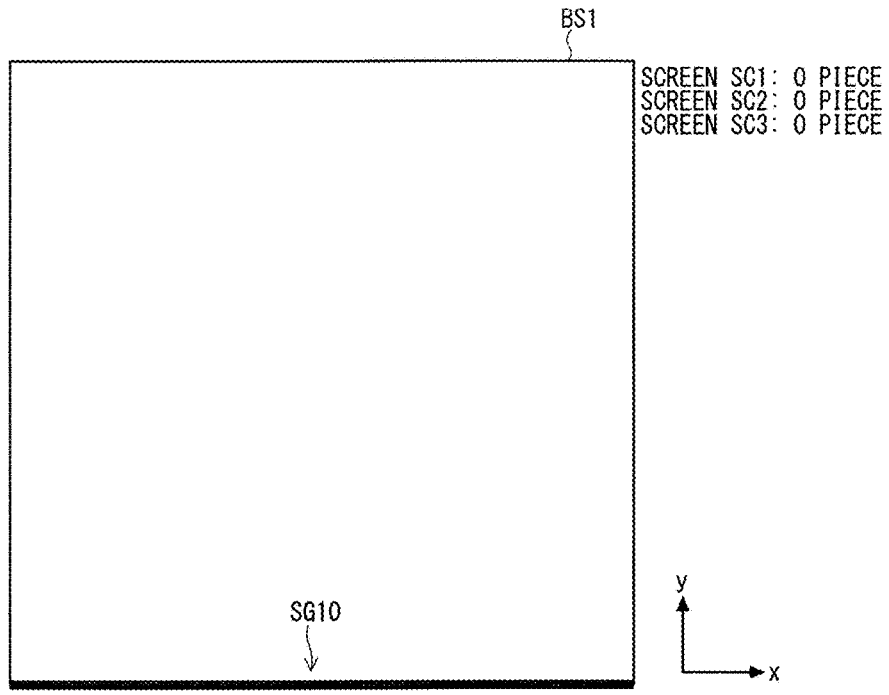
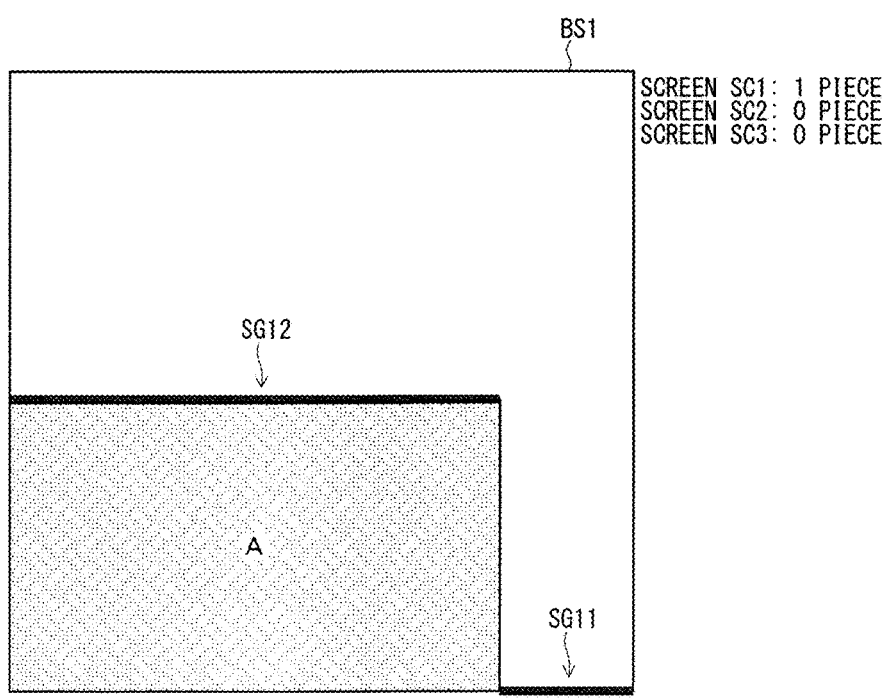

F I G. 2 0
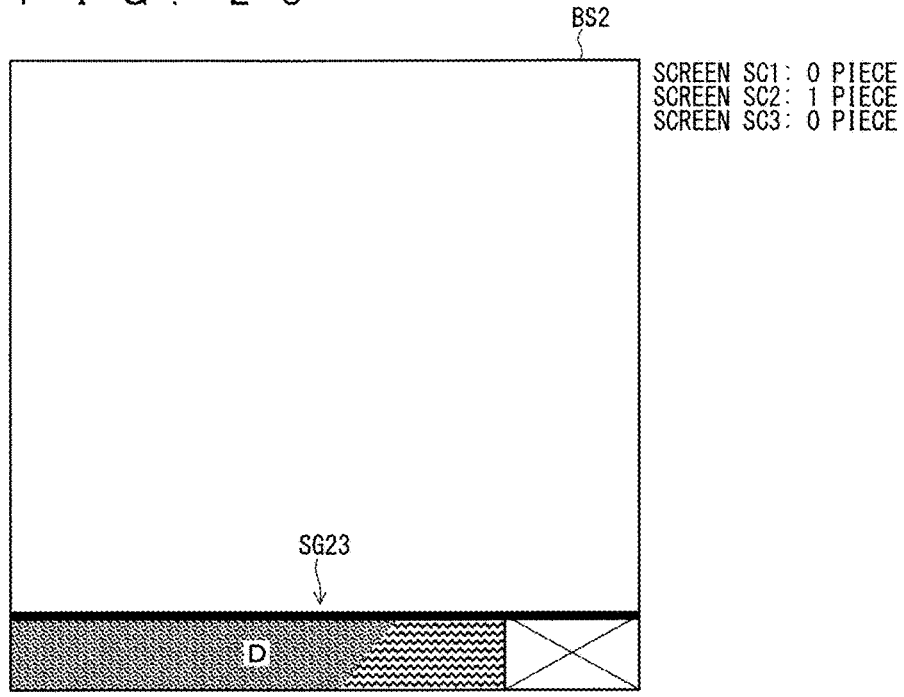
F I G. 2 1
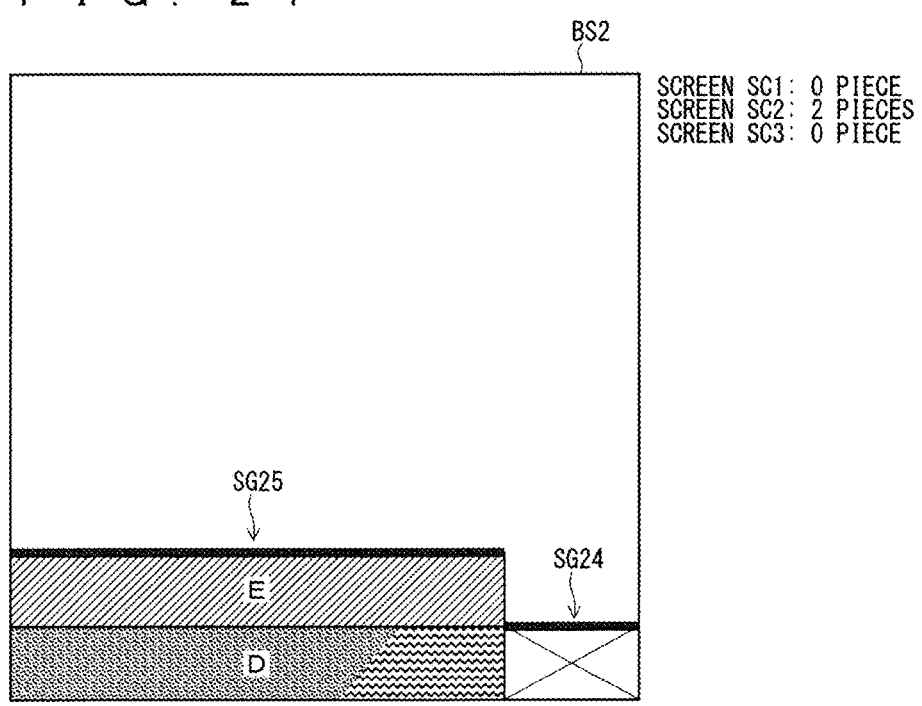

INFORMATION DISPLAY CONTROL SYSTEM AND METHOD OF MAPPING ELEMENTAL IMAGES INTO A TEXTURE ATLAS

TECHNICAL FIELD

The present invention relates to an information display control system, and particularly, relates to creation of a texture atlas.

BACKGROUND ART

As one of high speeding techniques of image display in an information display control system, there is a technique of using an atlas image (also referred to as a "texture atlas") in which a plurality of images are unified into one image. Since the plurality of images can be taken out of one texture atlas, the texture atlas is created in advance, whereby a number of readout times of image files is reduced, and a readout time of image data can be shortened.

In an event of creating the texture atlas, it is a challenge to determine how to efficiently arrange the plurality of images, which are different from one another in size, on the texture atlas. In usual, since the images for use in the information display control system are rectangular, this challenge can be handled as a "rectangle packing problem" in which rectangles are arranged on a two-dimensional surface with a fixed area without overlapping one another. A variety of approximate methods are known with regard to the rectangle packing problem. For example, the Best-fit method proposed in following Non-Patent Literature 1 is an algorithm that repeatedly packs rectangles which can use gaps to the maximum.

PRIOR ART DOCUMENTS

Non-Patent Documents

Non-Patent Document 1: Burk, E. K. G. Kendall, and G. Whitwell. (2004). "A New Placement Heuristic for the Orthogonal Stock-Cutting Problem." Operations Research, 52, 655-671

SUMMARY OF INVENTION

Problems to be Solved by the Invention

In recent years, an information display control system has been widespread, which switches and displays images of plural screens (hereinafter, simply referred to as "screens") on one display screen of hardware such as a smart phone and a car navigation device. The algorithms such as the Best-fit method, which are usable for creating the texture atlas, have been present heretofore; however, these algorithms have not presumed that the texture atlas is used for the information display control system that switches and displays the plurality of screens. Therefore, there is desired a creation technique of the texture atlas suitable for the information display control system that switches and displays the plurality of screens.

The present invention has been made in order to solve such a problem as described above, and it is an object of the present invention to provide an information display control system and a texture atlas creation method, which are capable of creating the texture atlas suitable for the information display control system that switches and displays the plurality of screens.

Means for Solving the Problems

An information display control system according to a first aspect of the present invention includes: a display processor capable of switching a plurality of screens and allowing a display to display the plurality of screens thereon; a texture atlas creator that creates a texture atlas in which elemental images as constituents of the plurality of screens are arranged in accordance with an algorithm that takes sizes of the elemental images as references; a texture atlas storage unit that stores the texture atlas created by the texture atlas creator; and a screen constructor that constructs the plurality of screens by using elemental images extracted from the texture atlas stored in the texture atlas storage unit, wherein, in an event of creating the texture atlas, the texture atlas creator preferentially incorporates, into the texture atlas, an elemental image for composing a screen including more elemental images already arranged in the texture atlas.

An information display control system according to a second aspect includes: a display processor capable of switching a plurality of screens and allowing a display to display the plurality of screens thereon; a texture atlas creator that creates a texture atlas in which elemental images as constituents of the plurality of screens are arranged in accordance with an algorithm that takes sizes of the elemental images as references; a texture atlas storage unit that stores the texture atlas created by the texture atlas creator; a screen constructor that constructs the plurality of screens by using elemental images extracted from the texture atlas stored in the texture atlas storage unit; and a frequency-of-display calculator that calculates a past frequency of display of each of the elemental images, wherein the texture atlas creator preferentially incorporates an elemental image, in which the past frequency of display is higher, into the texture atlas in the event of creating the texture atlas.

Effects of the Invention

In accordance with the first aspect of the present invention, it becomes easy to integrate the elemental images, which compose the same screen, into the same texture atlas, and accordingly the number of texture atlases necessary to compose one screen can be reduced, and a display speed of each of the screens can be accelerated.

In accordance with the second aspect of the present invention, it becomes easy to integrate the elemental images, in each of which the frequency of display is high, into the same texture atlas, and accordingly, the number of texture atlases necessary to compose the screen in which the frequency of display is high can be reduced, and as a whole, the display speed of the screen can be accelerated. Moreover, if the texture atlas is created while excluding the elemental image in which the display of frequency is low, then, while a decrease of convenience for a user is suppressed, the number of created texture atlases can be reduced, and a creation time of the texture atlases can be shortened.

Objects, features, aspects and advantages of the present invention will be more apparent by a following detailed description and the accompanying drawings.

BRIEF DESCRIPTION OF DRAWINGS

FIG. 1 is a configuration diagram of an information display control system according to an embodiment of the present invention.

FIG. 7 is a diagram showing a data table of the elemental images which compose the screens shown in FIG. 2 to FIG. 4.

FIG. 10 is a diagram for explaining a creation method of a texture atlas according to the embodiment of the present invention.

FIG. 11 is a diagram for explaining the creation method of the texture atlas according to the embodiment of the present invention.

FIG. 20 is a diagram for explaining the creation method of the texture atlas according to the embodiment of the present invention.

FIG. 21 is a diagram for explaining the creation method of the texture atlas according to the embodiment of the present invention.

DESCRIPTION OF EMBODIMENT

Figure 2:
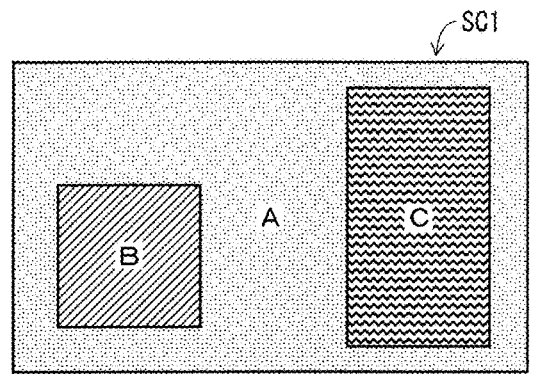
FIG. 2 is a diagram showing a configuration example of a screen outputted by an information display controller.

FIG. 1 is a configuration diagram of an information display control system according to an embodiment of the present invention. This information display control system is composed of an information display controller 10, a display 21 and an operation input device 22. Here, a configuration is shown, in which the display 21 and the operation input device 22 are attached as external devices to the information display controller 10; however, these may be composed integrally with the information display controller 10.

A liquid crystal display is representative of the display 21; however, the display 21 may be one that uses an arbitrary device having an image display function (for example, the device is such as a smart phone, a tablet terminal, and a display unit of a vehicle instrument panel). The operation input device 22 is a user interface that receives operations of a user for the information display controller 10. The operation input device 22 may be hardware such as operation buttons and a mouse, or may be software keys which use icons displayed on a display screen. In a case of allowing the display 21 to display thereon the software keys as the operation input device 22, the display 21 and the operation input device 22 may be composed as a touch panel that combines functions of both thereof with each other.

The information display controller 10 inputs an image signal to the display 21, and allows the display 21 to display a desired image thereon. Moreover, the information display controller 10 can allow a display screen of the display 21 to selectively display a plurality of screens thereon, and the user can switch the screens, which are displayed on the display 21, by operating the operation input device 22.

The information display controller 10 has a configuration including a display processor 11, an elemental image storage unit 12, a screen constructor 13, a texture atlas storage unit 14, a texture atlas creator 15, a frequency-of-display calculator 16, an operation history storage unit 17, a texture atlas re-creation condition storage unit 18 and a controller 19.

The information display controller 10 is composed by using a computer, and the display processor 11, the screen constructor 13, the texture atlas creator 15, the frequency-of-display calculator 16 and the controller 19 are realized in such a manner that the computer operates in accordance with a program. Meanwhile, the elemental image storage unit 12, the texture atlas storage unit 14 and the texture atlas re-creation condition storage unit 18 are composed of a storage medium such as a hard disk, a removable disk and a memory.

The display processor 11 has a function to create such an image signal for allowing the display 21 to display an image thereon, and can switch the plurality of images and can allow the display 21 to display the plurality of images thereon. Each of the plurality of images which the display 21 is allowed to display thereon includes one or more images, and an image that serves as a constituent of each screen is referred to as an "elemental image".

The elemental image storage unit 12 stores the elemental images of the plurality of screens. Moreover, the texture atlas storage unit 14 stores a texture atlas created by using the elemental images of the plurality of screens.

The screen constructor 13 constructs the screen, which the display 21 is allowed to display thereon, by using the elemental images stored in the elemental image storage unit 12, or by using the elemental images extracted from the texture atlas stored in the texture atlas storage unit 14. By using the texture atlas including the plurality of elemental images, the screen constructor 13 can reduce a number of reading times of image files in an event of acquiring the elemental images, and can perform such construction of the screen at high speed. This can contribute to high speeding of the image display.

Figure 3:
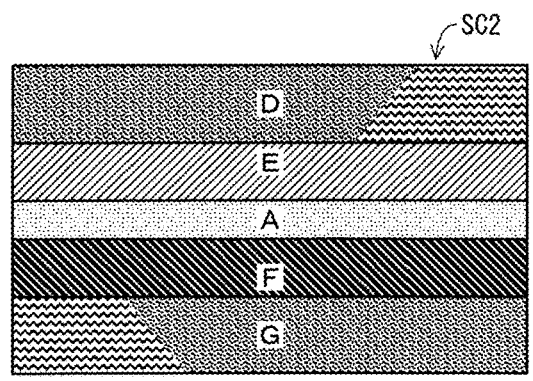
FIG. 3 is a diagram showing a configuration example of the screen outputted by the information display controller.
Figure 4:
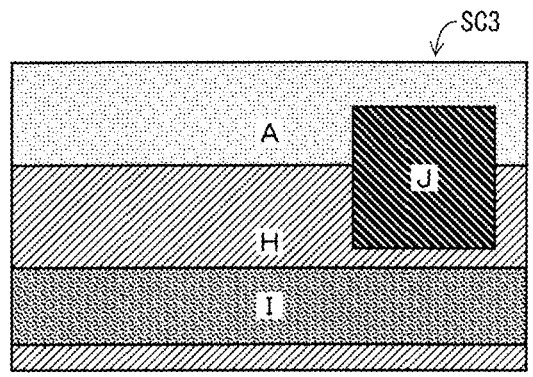
FIG. 4 is a diagram showing a configuration example of the screen outputted by the information display controller.

In this embodiment, it is assumed that the information display controller 10 allows the display 21 to display thereon a screen SC1 shown in FIG. 2, a screen SC2 shown in FIG. 3, and a screen SC3 shown in FIG. 4. In response to an operation of the user, the information display controller 10 switches the screens SC1 to SC3, and allows the display 21 to display the switched screens SC1 to SC3 thereon.

Figure 5:
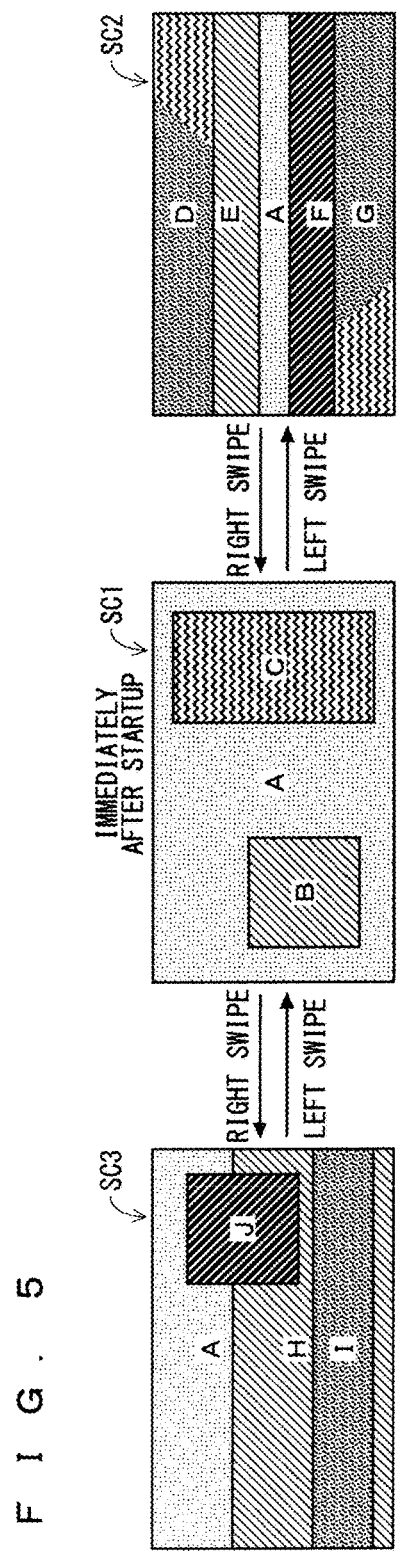
FIG. 5 is a diagram for explaining an example of a switching operation of a plurality of screens.

Moreover, as shown in FIG. 5, it is assumed that the screen SC1 is displayed immediately after the information display controller 10 is started up, and is switched to the screen SC2 or the screen SC3 in accordance with a gesture operation of the user. FIG. 5 shows an example of screen transition, in which the screen shifts to the screen SC2 when a leftward swipe operation (left swipe) is performed from the screen SC1, the screen returns to the screen SC1 when a rightward swipe operation (right swipe) is performed from the screen SC2, and moreover, the screen shifts to the screen SC3 when the right swipe is performed from the SC1, and the screen returns to the screen SC1 when the left swipe is performed from the screen SC3.

Figure 6:
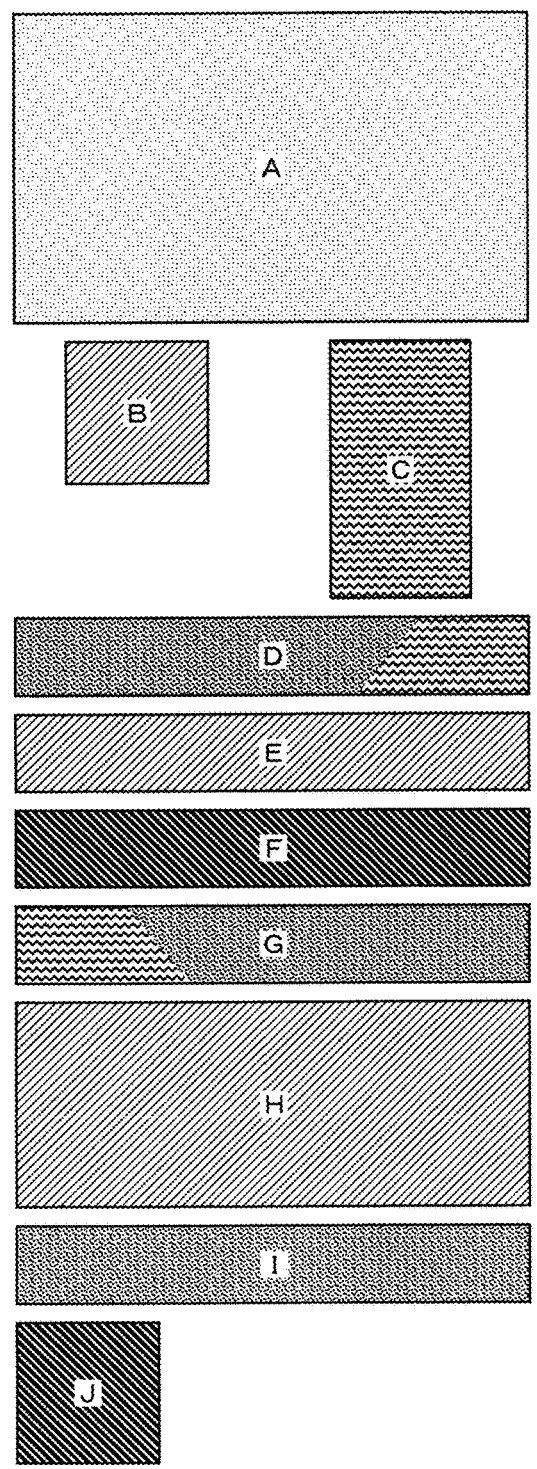
FIG. 6 is a diagram showing elemental images which compose the screens shown in FIG. 2 to FIG. 4.

FIG. 6 shows elemental images which compose the screens SC1 to SC3. The screen SC1 is composed of the elemental images A to C, the screen SC2 is composed of the elemental images A and D to G, and the screen SC3 is composed of the elemental images A and H to J.

FIG. 7 shows a data table showing a variety of parameters regarding to the elemental images A to J which compose the screens SC1 to SC3. This data table is stored in the texture atlas storage unit 14 together with image files of the elemental images A to J. As shown in FIG. 7, in the data table of the elemental images, there are described the parameters of the respective elemental images, which are "Width", "Height", "Using screen", "Horizontal symmetry" and "Vertical symmetry".

"Width" and "Height" indicate sizes of the elemental images (unit: pixel). "Using screen" indicates on which screen each of the elemental images is used. In a case where a plurality of the screens for use are present, it is defined that the elemental image is used for a screen (a screen to which the transition can be made by a smaller number of operations from a startup screen), which is more approximate to a screen (the startup screen) displayed immediately after the startup. For example, the elemental image A shown in FIG. 6 is used for all of the screens SC1 to SC3; however, in the data table of FIG. 7, the elemental image A is defined to be used for the screen SC1 that is the startup screen.

"Horizontal symmetry" indicates presence of other elemental image that has a horizontally reversed relationship. For example, since the elemental images D and G shown in FIG. 6 have such a horizontally reversed relationship, a value ("G") that indicates the elemental image G is described in a "horizontal symmetry" column of the elemental image D, and a value ("D") that indicates the elemental image D is described in a "horizontal symmetry" column of the elemental image G. In a similar way, "Vertical symmetry" indicates presence of other elemental image that has a vertically reversed relationship (in FIG. 6, a set of the elemental elements having the vertically reversed relationship is not present).

Returning to FIG. 1, the texture atlas creator 15 creates the texture atlas, in which the elemental images of the plurality of screens are arranged, in accordance with an algorithm (for example, the Best-fit method) that takes sizes of the elemental images as references. However, in the texture atlas creator 15 according to this embodiment, the above-described algorithm is improved so that, in an event of creating the texture atlas, elemental images for composing a screen including more elemental images already arranged in the texture atlas can be preferentially incorporated in the texture atlas. Moreover, in this embodiment, in the event where the texture atlas creator 15 creates the texture atlas, two elemental images having the vertically or horizontally reversed relationship are regarded as a same elemental image and are not allowed to be duplicately incorporated into the texture atlas.

Furthermore, in the event of creating the texture atlas, the texture atlas creator 15 preferentially incorporates an elemental image, in which a frequency of display in the past is higher, into the texture atlas. In this embodiment, the texture atlas creator 15 creates the texture atlas while excluding an elemental image, in which the frequency of display in the past is lower than a predetermined value.

Therefore, in the information display controller 10, the frequency-of-display calculator 16, which calculates the frequency of display of each of the elemental images, is provided. Every time when the display processor 11 switches the screen to be displayed on the display 21, the frequency-of-display calculator 16 increments a number of display times of the element image included in the displayed screen (a screen outputted by the display processor 11), and thereby counts the number of display times of each elemental image, and the frequency of display of each elemental image is calculated based on a count value thereof.

In a manufacturing process of the information display controller 10, in the texture atlas storage unit 14, there is stored an initial value (a default texture atlas) created by a manufacturer of the information display controller 10. However, at an actual usage time of the information display controller 10, every time when the texture atlas creator 15 creates (re-creates) the texture atlas, a newly created texture atlas is stored in the texture atlas storage unit 14.

The operation history storage unit 17 stores an operation history of the information display controller 10, in which there are stored at least a number of operation ending (shutdown) times of the information display controller 10 and a number of times that the screen is switched (that is, a number of screen transition times). When the number of shutdown times or the number of screen transition times satisfies a predetermined condition (a re-creation execution condition), the texture atlas creator 15 re-creates the texture atlas.

The texture atlas re-creation condition storage unit 18 stores conditions regarding to the creation (re-creation) of the texture atlas by the texture atlas creator 15, in which there are stored the re-creation execution condition for determining whether or not to create the atlas image, and an elemental image selection condition for determining whether or not to use each elemental image for creating the texture atlas.

The re-creation execution condition is a threshold value of the number of shutdown times and a screen of the number of screen transition times. For example, if the threshold value of the number of shutdown times is set to "five times" as the re-creation execution condition, then when the information display controller 10 is shut down five times, the texture atlas is created by the texture atlas creator 15 at a next startup time. Moreover, if the threshold value of the number of screen transition times is set as "twenty times" as the re-creation execution condition, then when the user shifts twenty times the screen, which is displayed on the display 21, the texture atlas is created by the texture atlas creator 15 at the next startup time.

The elemental image selection condition is a threshold value of the frequency of display of the elemental image. If the threshold value of the frequency of display of the elemental image is set as an "average value of the frequencies of display of all the elemental images" as the elemental image selection condition, then the texture atlas creator 15 excludes elemental images, which are displayed at such an average frequency or less, and by using remaining elemental images, creates the texture atlas (that is, such elemental images displayed at a higher frequency than the average are preferentially incorporated into the texture atlas).

In this embodiment, it is defined that the re-creation execution condition and the elemental image selection condition are set by the manufacturer of the information display controller 10; however, the user of the information display controller 10 may be made capable of changing such setting.

Based on an operation of the user for the operation input device 22, the controller 19 comprehensively controls the respective constituents of the information display controller 10.

In this embodiment, the elemental images stored in the elemental image storage unit 12, the default atlas images stored in the texture atlas storage unit 14, and the re-creation execution condition and the elemental image selection condition, which are stored in the texture atlas re-creation condition storage unit 18, are those stored therein by the manufacturer by using the initial setting device (for example, a personal computer and the like) at a manufacturing stage of the information display controller 10.

Figure 8:
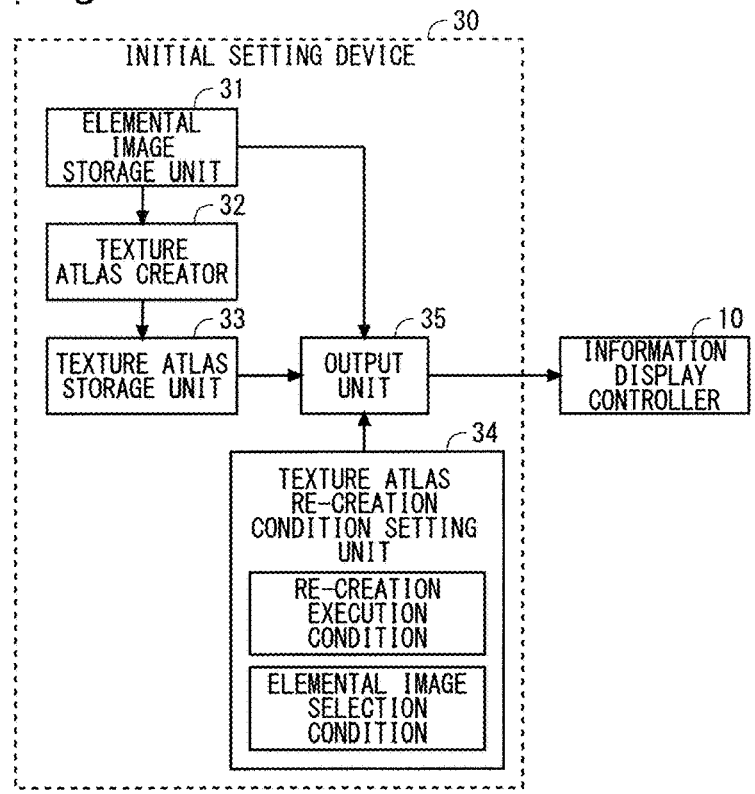
FIG. 8 is a configuration diagram of an initial setting device according to the embodiment of the present invention.

FIG. 8 is a configuration diagram of such an initial setting device 30 that performs initial setting of the information display controller 10. This initial setting device 30 includes an elemental image storage unit 31, a texture atlas creator 32, a texture atlas storage unit 33, a texture atlas re-creation condition setting unit 34, and an output unit 35.

The elemental image storage unit 31 stores the elemental images to be stored in the elemental image storage unit 12 of the information display controller 10, and stores the data table thereof. The texture atlas storage unit 33 stores the default texture atlas to be stored in the texture atlas storage unit 14 of the information display controller 10. The texture atlas stored in the texture atlas storage unit 33 is created by the texture atlas creator 32.

The texture atlas re-creation condition setting unit 34 is a user interface for setting the re-creation execution condition and the elemental image selection condition, which are to be stored in the texture atlas re-creation condition storage unit 18 of the information display controller 10, and in addition, has a function to store the re-creation execution condition and the elemental image selection condition, which are thus set.

The output unit 35 outputs the elemental images and the data table thereof, which are stored in the elemental image storage unit 31, such texture atlases stored in the texture atlas storage unit 33, and the re-creation execution condition and the elemental image selection condition, which are stored in the texture atlas re-creation condition setting unit 34, to the information display controller 10. The information display controller 10 allows the elemental image storage unit 12, the texture atlas storage unit 14 and the texture atlas re-creation condition storage unit 18 to store therein those data inputted from the initial setting device 30.

Figure 9:
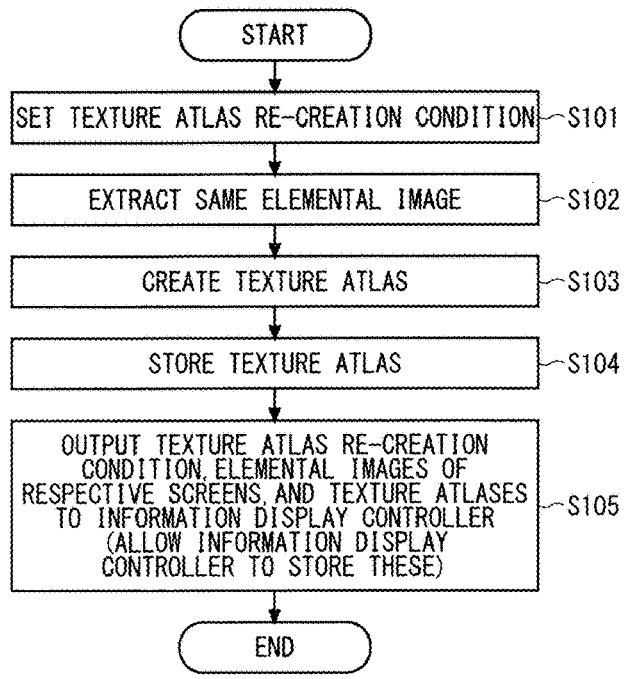
FIG. 9 is a flowchart showing operations of the initial setting device according to the embodiment of the present invention.

FIG. 9 is a flowchart showing operations of the initial setting device 30, and shows initial setting processing of the information display controller 10. In the initial setting processing of the information display controller 10, first, the user of the initial setting device 30 (that is, the manufacturer of the information display controller 10) operates the texture atlas re-creation condition setting unit 34, and sets the re-creation execution condition and the elemental image selection condition (Step S101). Those setting values are held by the texture atlas re-creation condition setting unit 34.

Prior to the creation of the texture atlas, the texture atlas creator 32 analyzes the data of the respective elemental images, which are stored in the elemental image storage unit 31, and extract same elemental images (Step S102). At this time, not only completely same elemental images but also elemental images, which have the vertically or horizontally reversed relationship, are extracted as the same ones. An extraction result of the same elemental images is reflected on the data table of the elemental images stored in the elemental image storage unit 31.

Subsequently, the texture atlas creator 32 creates the texture atlas by using the elemental images stored in the elemental image storage unit 31 (Step S103) (details of the creation of the texture atlas will be described later). The texture atlas created by the texture atlas creator 32 is stored in the texture atlas storage unit 33 (Step S104).

Thereafter, the output unit 35 outputs the re-creation execution condition and the elemental image selection condition, which are stored in the texture atlas re-creation condition setting unit 34, the elemental images of the respective screens, which are stored in the elemental image storage unit 31, and the texture atlases, which are stored in the texture atlas storage unit 33, to the information display controller 10 (Step S105). The information display controller 10 allows the texture atlas re-creation condition storage unit 18, the elemental image storage unit 12 and the texture atlas storage unit 14 to store those pieces of the information, which are inputted from the initial setting device 30, individually therein.

Note that, in a case of continuously performing the initial setting for a plurality of the information display controllers 10, the processing of Steps S101 to S104 in FIG. 9 just needs to be performed only a first time. That is to say, only Step S105 just needs to be performed on and after a second time.

Next, by using a specific example, a description is made of an algorithm in the event where the texture atlas creator 32 creates the texture atlas in Step S103 of FIG. 9. The texture atlas creator 32 of this embodiment creates the texture atlas based on a following algorithm achieved by improving the Best-fit method (hereinafter, the algorithm is referred to as an "improved Best-fit method"). Note that a "rectangle" in the description of the improved Best-fit method corresponds to each elemental image.

In the improved Best-fit method, following STEP1 to STEP4 are repeated until all the rectangles (elemental images) are arranged.

[STEP1]

A segment, which satisfies the following conditions (1a) to (1e), is extracted.

(1a): The segment is parallel to an X-axis.

(1b): The segment does not overlap other extracted segments.

(1c): A rectangle is not arranged on the segment yet.

(1d): The segment is in contact with an upper end or lower end of an already arranged rectangle.

(1e): The segment has a Y-coordinate different from that of a segment adjacent thereto, and has an x-coordinate common to that of the adjacent segment.

[STEP2]

Among such segments extracted in STEP1, a segment, in which a y-coordinate is minimum, is selected.

[STEP3]

On a left end of the segment selected in STEP2, a rectangle, which satisfies following conditions (3a) to (3f), is arranged.

(3a): A width of the rectangle is equal to or less than a width of the selected segment.

(3b): The rectangle is not arranged on a base material (a texture atlas) yet.

(3c): Among such rectangles which are not arranged on the base material, the rectangle has a width most approximate to the width of the selected segment.

(3d): In a case where a plurality of the rectangles (elemental images), which satisfy the condition (3c), are present, an elemental image of a screen including more elemental images already arranged on the base material is selected.

(3e): In a case where a plurality of the rectangles, which satisfy the condition (3d), are present, a rectangle having largest height is selected.

[STEP4]

In a case where the rectangle, which satisfies the conditions in STEP3, is not present, the selected segment is discarded, and is merged with a segment having a smaller y-coordinate among segments adjacent thereto.

This improved Best-fit method algorithm is one formed by adding the condition (3d) to the general Best-fit method.

Here, as a specific example, there is shown an example of creating the texture atlas in accordance with the improved Best-fit method by using the elemental images (FIG. 6) which compose the screens SC1 to SC3 shown in FIG. 2 to FIG. 4. Parameters such as sizes of the respective elemental images are as shown in FIG. 7. Moreover, it is defined that the size of the texture atlas is 1024×1024 pixels.

First, as shown in FIG. 10, a base material BS1 (a two-dimensional plane with 1024×1024 pixels) of the texture atlas is prepared. Respective directions of the x-axis and the y-axis are defined as in FIG. 10. In this state, a base of the base material BS1 is extracted as a segment SG10 in STEP1, and the segment SG10 is selected in STEP2. Among unarranged elemental images, those having widths equal to or less than a width of the segment SG10 and most approximate to the width of the segment SG10 are seven elemental images which are A and D to I. At this point of time, no elemental image is arranged on the base material BS1, and accordingly, all of the elemental images A and D to I satisfy the condition (3d), and the condition (3e) is applied. As a result, in STEP3, as shown in FIG. 11, the elemental image A having the largest height among the elemental images A and D to I is arranged on the segment SG10.

When a state of FIG. 11 is established, then in STEP1, a residual portion as a result of removing a portion, in which the elemental image A is arranged, from the segment SG10 is extracted as a segment SG11, and an upper side of the elemental image A is extracted as a segment SG12. Then in STEP2, the segment SG11, which has the minimum y-coordinate among them, is selected. Among the unarranged elemental images, those having widths equal to or less than a width of the segment SG11 and most approximate to the width of the segment SG11 are three elemental images which are B, C and J. At this point of time, on the base material BS1, there is arranged: 1 piece of the elemental image of the screen SC1; 0 piece of the elemental image of the screen SC2; and 0 piece of the elemental image of the screen SC3. That is to say, among the screens SC1 and SC3, which include the elemental images B, C and J, the screen including more elemental images already arranged on the base material BS1 is the screen SC1. Hence, among the elemental images B, C and J, those which satisfy the condition (3d) are two elemental images B and C which compose the screen SC1. In this case, the condition (3e) is further applied, and in STEP3, as in FIG. 12, the elemental image C having the largest height among the elemental images B and C is arranged on the segment SG11.

Figure 12:
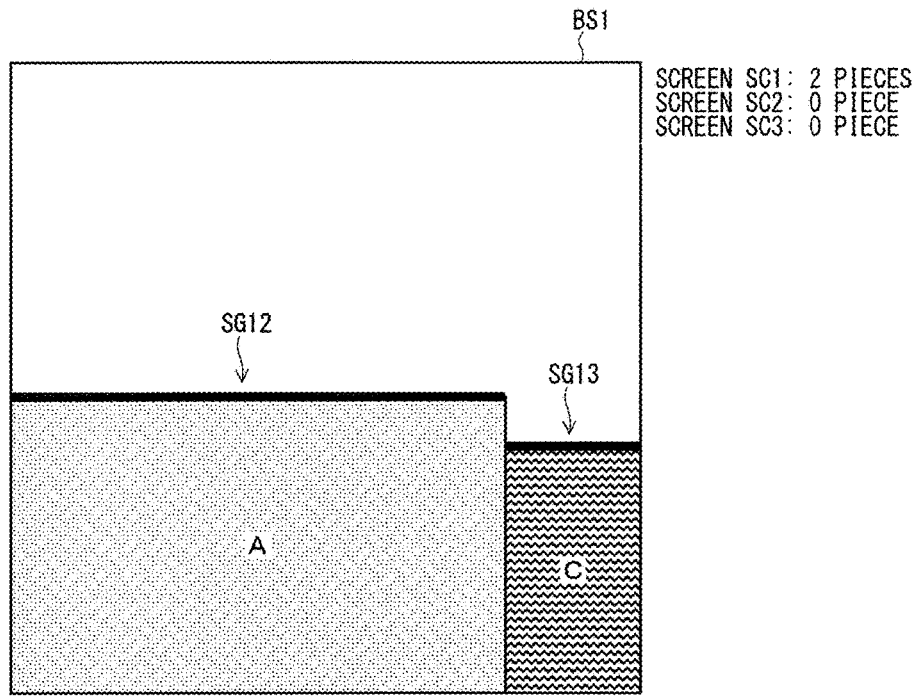
FIG. 12 is a diagram for explaining the creation method of the texture atlas according to the embodiment of the present invention.

The width of the elemental image C is equal to that of the segment SG11, and accordingly, when a state of FIG. 12 is established, then in STEP1, a segment SG13 as an upper side of the elemental image C and the segment SG12 as the upper side of the elemental image A are extracted. Then in STEP2, the segment SG13, which has the minimum y-coordinate among them, is selected. Among the unarranged elemental images, those having widths equal to or less than a width of the segment SG13 and most approximate to the width of the segment SG13 are two elemental images which are B and J. At this point of time, on the base material BS1, there are arranged: 2 pieces of the elemental images of the screen SC1; 0 piece of the elemental image of the screen SC2; and 0 piece of the elemental image of the screen SC3. Hence, in STEP3, among the elemental images B and J, the elemental image B that composes the screen SC1 is selected, and as in FIG. 13, the elemental image B is arranged on the segment SG13.

Figure 13:
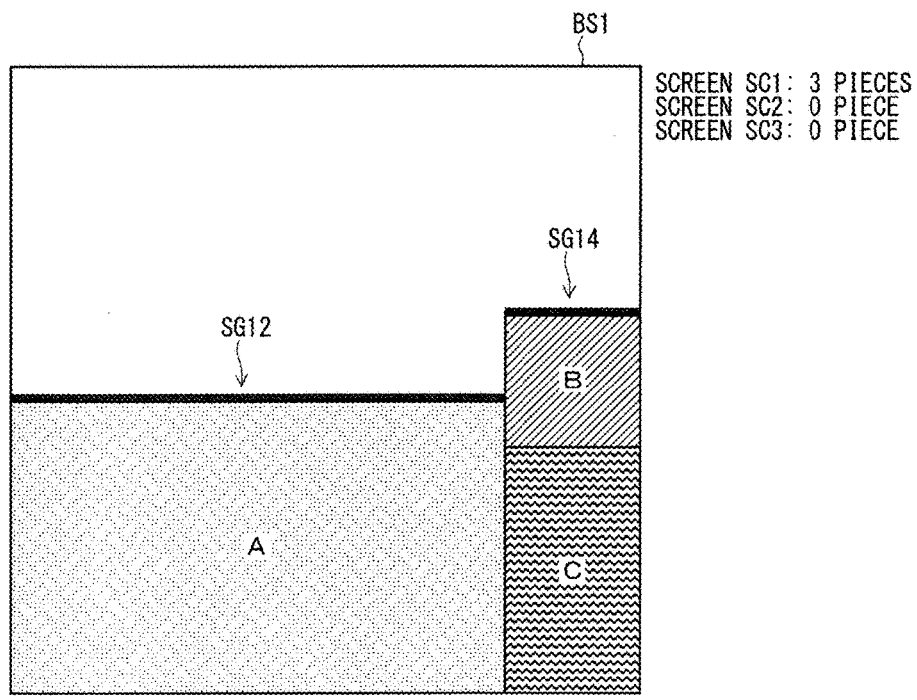
FIG. 13 is a diagram for explaining the creation method of the texture atlas according to the embodiment of the present invention.

The width of the elemental image B is equal to that of the segment SG13, and accordingly, when a state of FIG. 13 is established, then in STEP1, a segment SG14 as an upper side of the elemental image B and the segment SG12 as the upper side of the elemental image A are extracted. Then in STEP2, the segment SG12, which has the minimum y-coordinate among them, is selected. Among the unarranged elemental images, those having widths equal to or less than a width of the segment SG12 and most approximate to the width of the segment SG12 are six elemental images which are D to I. At this point of time, on the base material BS1, there are arranged: 3 pieces of the elemental images of the screen SC1; 0 piece of the elemental image of the screen SC2; and 0 piece of the elemental image of the screen SC3. The elemental images D to I are included in the screen SC2 or the screen SC3, and accordingly, all of the elemental images D to I satisfy the condition (3d), and the condition (3e) is further applied. As a result, in STEP3, as shown in FIG. 14, the elemental image H having the largest height among the elemental images D to I is arranged on the segment SG12.

Figure 14:
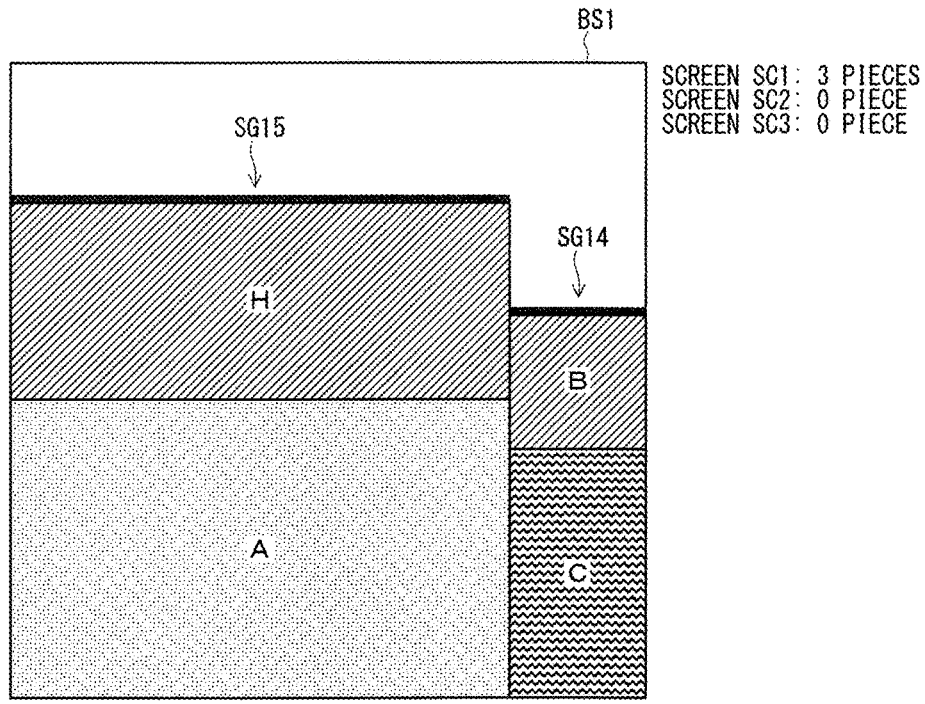
FIG. 14 is a diagram for explaining the creation method of the texture atlas according to the embodiment of the present invention.

The width of the elemental image H is equal to that of the segment SG12, and accordingly, when a state of FIG. 14 is established, then in STEP1, a segment SG15 as an upper side of the elemental image H and the segment SG14 as the upper side of the elemental image B are extracted. Then in STEP2, the segment SG14, which has the minimum y-coordinate among them, is selected. Among the unarranged elemental images, those having widths equal to or less than a width of the segment SG14 and most approximate to the width of the segment SG14 are one elemental image which is J. Hence, in STEP3, as in FIG. 15, the elemental image J is arranged on the segment SG14.

Figure 15:
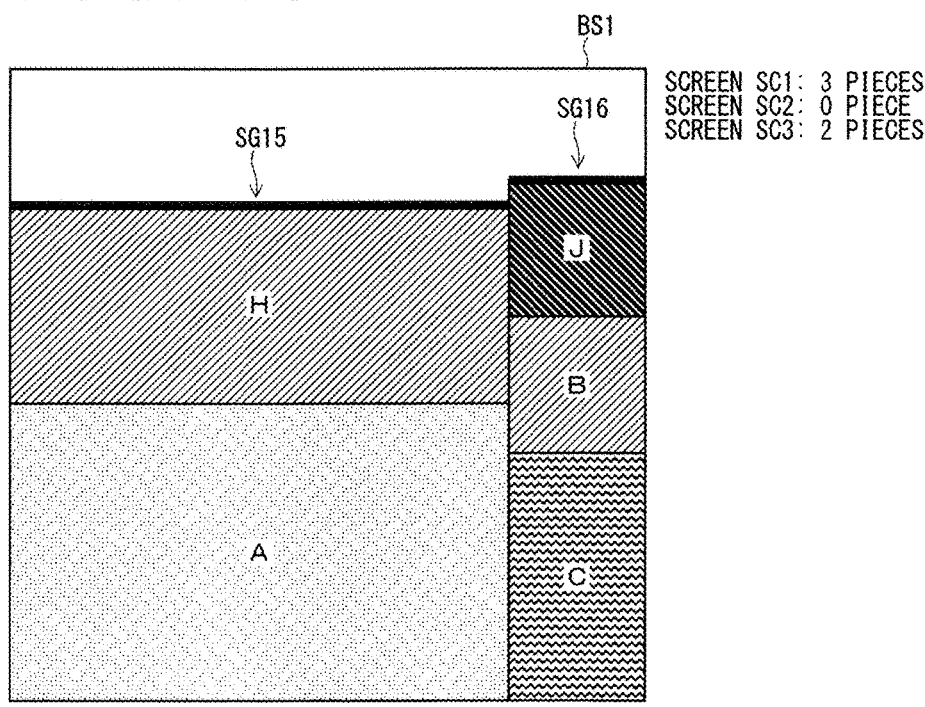
FIG. 15 is a diagram for explaining the creation method of the texture atlas according to the embodiment of the present invention.

The width of the elemental image J is equal to that of the segment SG14, and accordingly, when a state of FIG. 15 is established, then in STEP1, a segment SG16 as an upper side of the elemental image J and the segment SG15 as the upper side of the elemental image H are extracted. Then in STEP2, the segment SG15, which has the minimum y-coordinate among them, is selected. Among the unarranged elemental images, those having widths equal to or less than a width of the segment SG15 and most approximate to the width of the segment SG15 are five elemental images which are D to G and I. At this point of time, on the base material BS1, there are arranged: 3 pieces of the elemental images of the screen SC1; 0 piece of the elemental image of the screen SC2; and 2 pieces of the elemental images of the screen SC3. That is to say, among the screens SC2 and SC3, which include the elemental images D to G and I, the screen including more elemental images already arranged on the base material BS1 is the screen SC3. Hence, in STEP3, among the elemental images D to G and I, the elemental image I that composes the screen SC3 is selected, and as in FIG. 16, the elemental image I is arranged on the segment SG15.

Figure 16:
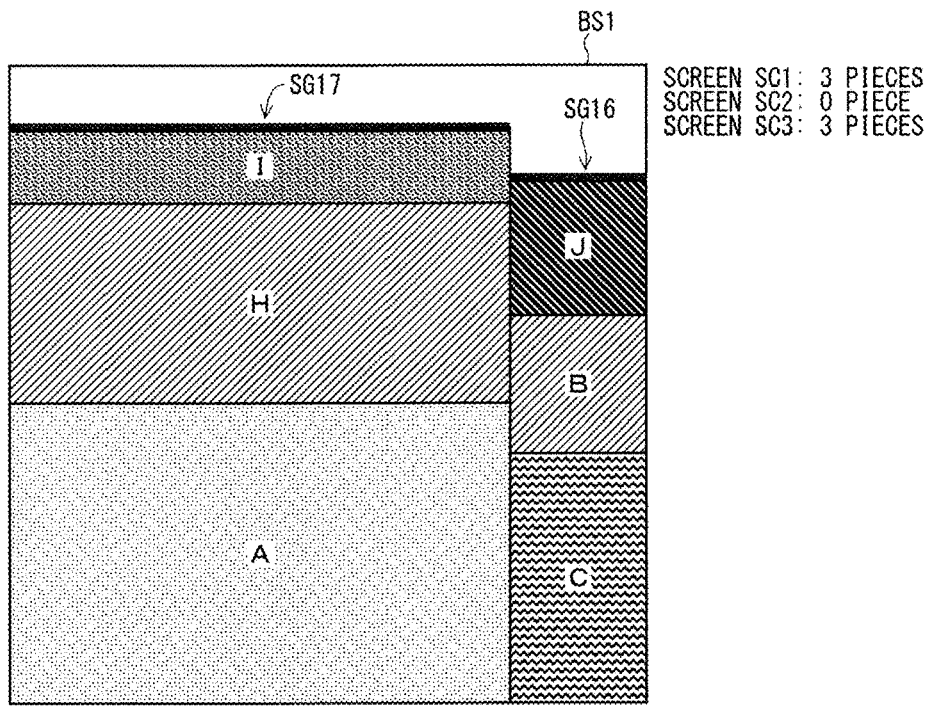
FIG. 16 is a diagram for explaining the creation method of the texture atlas according to the embodiment of the present invention.

The width of the elemental image I is equal to that of the segment SG15, and accordingly, when a state of FIG. 16 is established, then in STEP1, a segment SG17 as an upper side of the elemental image I and the segment SG16 as the upper side of the elemental image J are extracted. Then in STEP2, the segment SG16, which has the minimum y-coordinate among them, is selected. However, among the unarranged elemental images, those having widths equal to or less than a width of the segment SG16 are not left. That is to say, such an element that satisfies the condition of STEP3 is not present, and accordingly, STEP4 is applied. In STEP4, the selected segment SG16 is merged with the segment SG17 adjacent thereto. As a result, in next STEP1, as in FIG. 17, a segment SG18, which is obtained by extending the segment SG17 toward above the segment SG16, is extracted.

Figure 17:
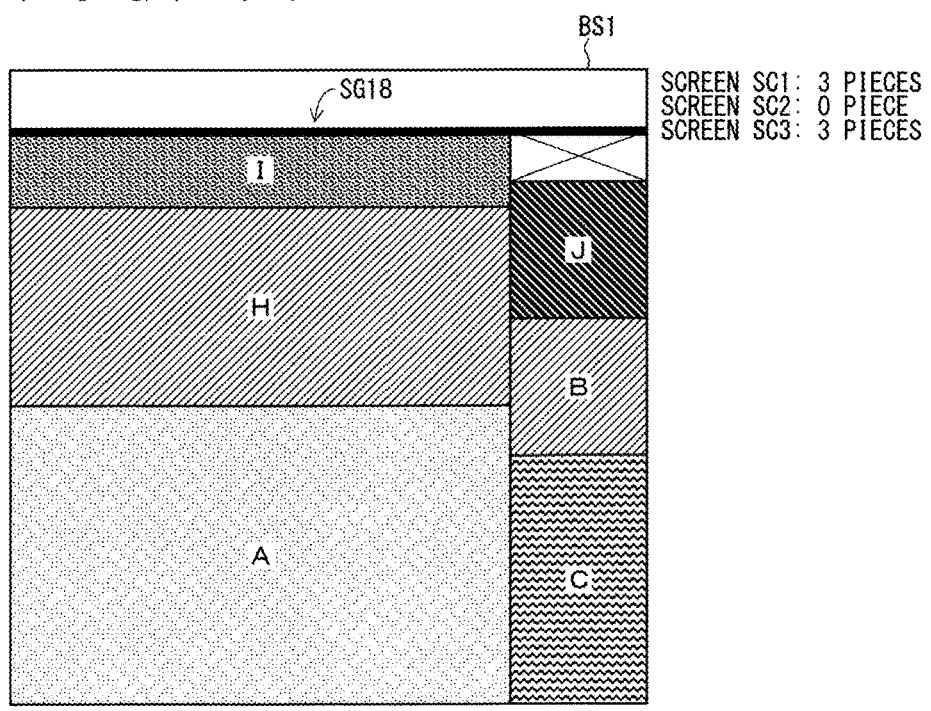
FIG. 17 is a diagram for explaining the creation method of the texture atlas according to the embodiment of the present invention.
Figure 18:
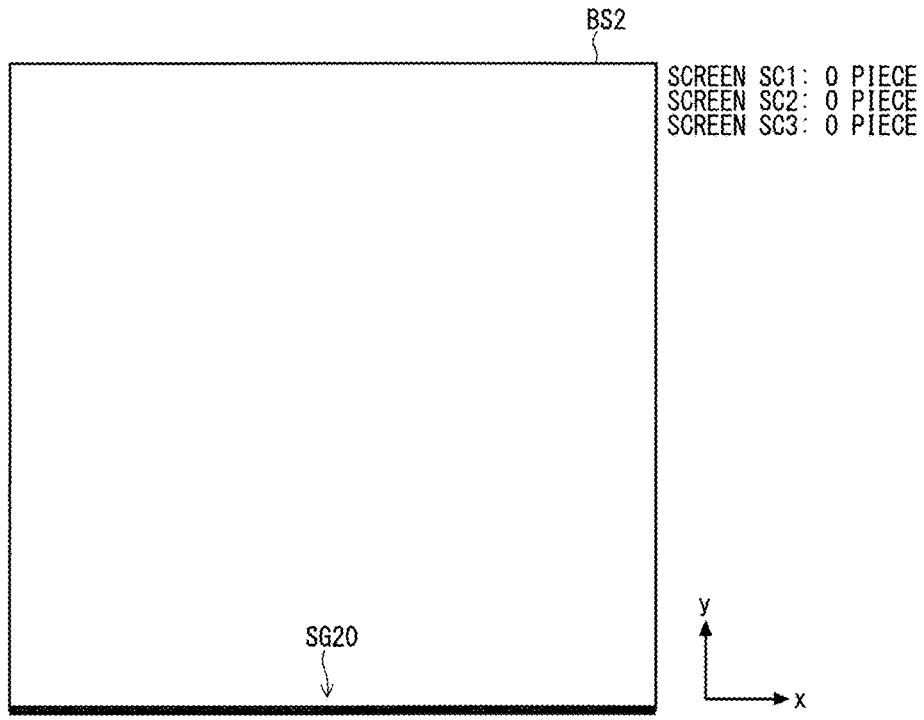
FIG. 18 is a diagram for explaining the creation method of the texture atlas according to the embodiment of the present invention.

When a state of FIG. 17 is established, then in the base material BS1, only a space with a height of 104 pixels is left on the segment SG18, and accordingly, any of the unarranged elemental images D to G cannot be arranged thereon. In this case, the texture atlas creator 32 allows the texture atlas storage unit 33 to store the texture atlas of FIG. 17 therein, and prepares a new base material BS2 as shown in FIG. 18. Note that a number of elemental images arranged on the base material BS2 is counted separately from the number thereof arranged on the base material BS1 (In FIG. 18, the number of elemental images of each of the screens SC1, SC2 and SC3 is "0 piece").

In a state of FIG. 18, a base of the base material BS2 is extracted as a segment SG20 in STEP1, and the segment SG20 is selected in STEP2. Among the unarranged elemental images, those having widths equal to or less than a width of the segment SG20 and most approximate to the width of the segment SG20 are four elemental images which are D to G. At this point of time, on the base material BS2, no piece of the elemental images is not arranged, and accordingly, all of the elemental images D to G satisfy the condition (3d), and the condition (3e) is applied; however, all of the elemental images D to G have a same height, and accordingly, the elemental image to be arranged is not determined uniquely. In this case, an arbitrary elemental image just needs to be selected; however, in this embodiment, it is defined that one, in which a number assigned in the data table of FIG. 7 is smallest, is selected. Hence, as in FIG. 19, the elemental image D, in which the number is smallest among those of the elemental images D to G, is arranged on the segment SG20.

When the elemental image D is arranged on the texture atlas, the elemental image G, which is a same image as the elemental image D (that is, the elemental image G is an image having a horizontally reversed relationship therewith), is also regarded to finish being arranged on the texture atlas. In such a way, the elemental image D and the elemental image G, which are determined to be the same images, can be prevented from being duplicately arranged on the texture atlas, and the number of texture atlases is suppressed, and accordingly, this can contribute to the high speeding of the screen display.

Figure 19:
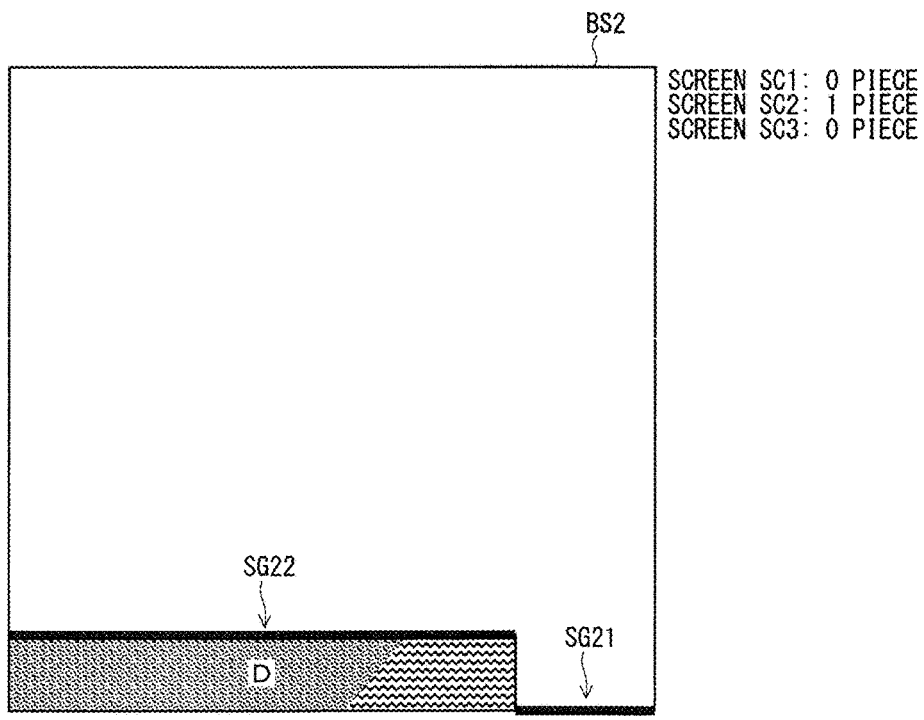
FIG. 19 is a diagram for explaining the creation method of the texture atlas according to the embodiment of the present invention.

When a state of FIG. 19 is established, then in STEP1, a residual portion as a result of removing a portion, in which the elemental image D is arranged, from the segment SG20 is extracted as a segment SG21, and an upper side of the elemental image D is extracted as a segment SG22. Then in STEP2, the segment SG21, which has the minimum y-coordinate among them, is selected. However, among the unarranged elemental images, those having widths equal to or less than a width of the segment SG21 are not left. That is to say, such an element that satisfies the condition of STEP3 is not present, and accordingly, STEP4 is applied. In STEP4, the selected segment SG21 is merged with the segment SG22 adjacent thereto.

As a result, in next STEP1, as in FIG. 20, a segment SG23, which is obtained by extending the segment SG22 toward above the segment SG21, is extracted. Then in STEP2, the segment SG23 is selected. Among the unarranged elemental images, those having widths equal to or less than a width of the segment SG23 and most approximate to the width of the segment SG23 are two elemental images which are E and F. Both of the elemental images E and F are included in the screen SC2, and have a same height, and accordingly, the elemental image to be arranged is not determined uniquely even if the conditions (3d) and (3e) are applied. Hence, as in FIG. 21, the elemental image E in which a number in the data table of FIG. 7 is small is arranged on the segment SG23.

When a state of FIG. 21 is established, then in STEP1, a residual portion as a result of removing a portion, in which the elemental image E is arranged, from the segment SG23 is extracted as a segment SG24, and an upper side of the elemental image E is extracted as a segment SG25. Then in STEP2, the segment SG24, which has the minimum y-coordinate among them, is selected. However, among the unarranged elemental images, those having widths equal to or less than a width of the segment SG24 are not left. That is to say, such an element that satisfies the condition of STEP3 is not present, and accordingly, STEP4 is applied. In STEP4, the selected segment SG24 is merged with the segment SG25 adjacent thereto.

Figure 22:
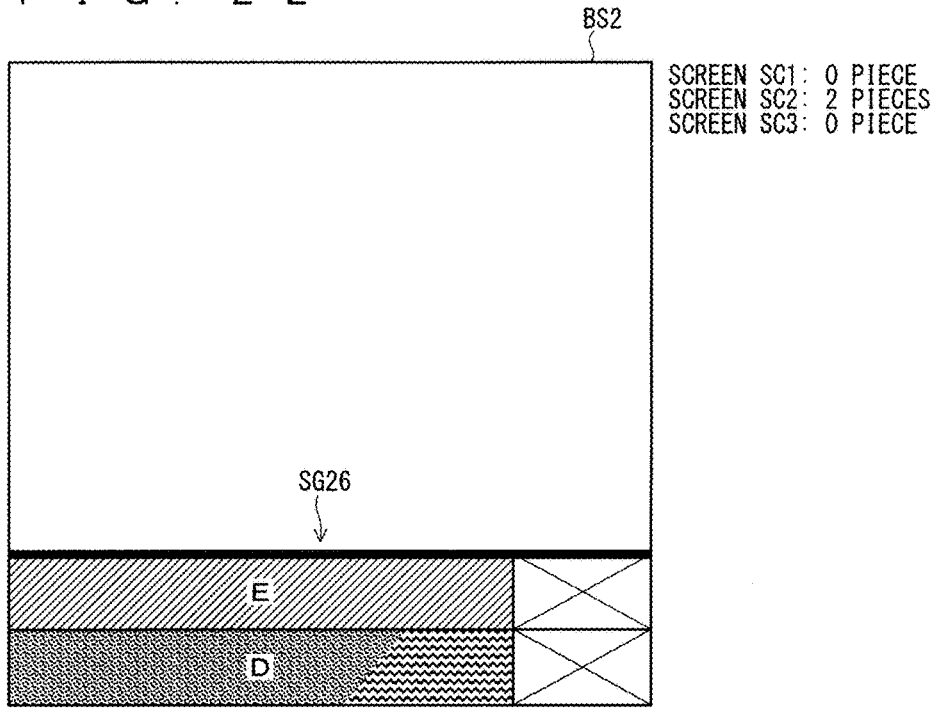
FIG. 22 is a diagram for explaining the creation method of the texture atlas according to the embodiment of the present invention.

As a result, in next STEP1, as in FIG. 22, a segment SG26, which is obtained by extending the segment SG25 toward above the segment SG24, is extracted. Then in STEP2, the segment SG26 is selected. At this time, the unarranged elemental images are only the elemental image F. The elemental image F has a width equal to or less than a width of the segment S26, and accordingly, is arrangeable on the segment SG26. Hence, as in FIG. 23, the elemental image F is arranged on the segment SG26. In such a way, a texture atlas using the base material BS2 is completed. The texture atlas creator 32 adds the completed texture atlas to the texture atlas storage unit 33 and allows the texture atlas storage unit 33 to store the completed texture atlas therein.

By the above-described processing, two texture atlases including all of the elemental images A to J are completed, and are stored in the texture atlas storage unit 33. As mentioned before, the texture atlases, which are stored in the texture atlas storage unit 33, are sent through the output unit 35 to the information display controller 10, and are stored as default texture atlases in the texture atlas storage unit 14 of the information display controller 10.

Figure 24:
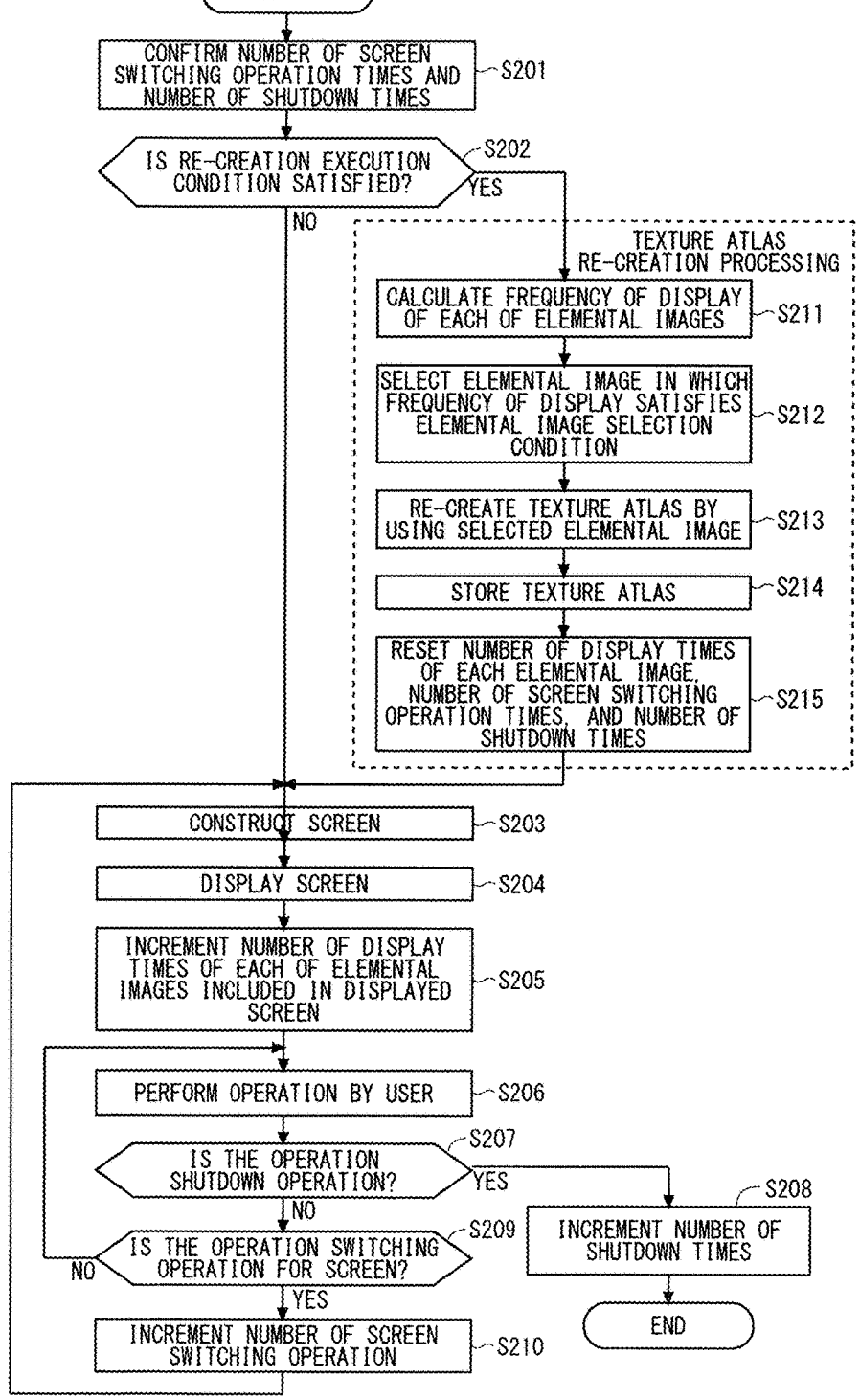
FIG. 24 is a flowchart showing operations of the information display controller according to the embodiment of the present invention.

Next, a description is made of operations of the information display controller 10 shown in FIG. 1. FIG. 24 is a flowchart showing the operations.

When the information display controller 10 is started, the controller 19 accesses the operation history storage unit 17, and confirms the number of screen transition times and the number of shutdown times until previous shutdown (Step S201). Then, the controller 19 confirms whether or not the number of screen transition times or the number of shutdown times satisfies the re-creation execution condition (Step S202). That is to say, the controller 19 confirms whether or not a number of switching operation times for the screens or the number of shutdown times has reached a predetermined threshold value.

If the re-creation execution condition is not satisfied (NO in Step S202), the re-creation of the texture atlas is not performed, and the screen constructor 13 constructs the screen, which the display 21 is allowed to display thereon, by using the texture atlas already stored in the texture atlas storage unit 14 (or the default texture atlas at the time of the first startup) (Step S203). Note that, when it is necessary to construct the screen by using the elemental image that is not included in the texture atlas, the screen constructor 13 can acquire a desired elemental image from the elemental image storage unit 12.

The display processor 11 allows the display 21 to display the screen, which is constructed by the screen constructor 13, thereon (Step S204). At this time, the frequency-of-display calculator 16 increments the number of display times of each of the elemental images included in the screen (the screen outputted by the display processor 11) displayed on the display 21 (Step S205).

Thereafter, when the operation by the user is performed (Step S206), the controller 19 confirms whether or not the operation is an operation (a shutdown operation) of shutting down the information display controller 10 (Step S207). If the operation by the user is the shutdown operation (YES in Step S207), the controller 19 allows the operation history storage unit 17 to increment the number of shutdown times (Step S208), and thereafter, ends the information display controller 10.

If the operation by the user is not the shutdown operation (NO in Step S207), then the controller 19 further confirms whether or not the operation is the switching operation for the screens (Step S209). If the operation is the switching operation for the screens (YES in Step S209), then the controller 19 allows the operation history storage unit 17 to increment the number of switching operation times for the screens (Step S210), and thereafter, returns to Step S203 in order to construct and display the screen after the transition. If the operation is not the switching operation for the screens (NO in Step S209), then the controller 19 performs a variety of processing corresponding to the operation, and returns to Step S206 in order to wait for a next operation by the user.

Meanwhile, at the startup time of the information display controller 10, in a case where the re-creation execution condition is satisfied (YES in Step S202), re-creation processing (Steps S211 to 215) of the texture atlas is executed before Step S203 for constructing the screen.

In such texture atlas re-creation processing, first, the frequency-of-display calculator 16 calculates the frequency of display of each of the elemental images based on the number of display times of each elemental image (Step S211). Then, the texture atlas creator 15 selects the elemental images in each of which the frequency of display satisfies the elemental image selection condition (for example, the elemental images are elemental images displayed at a frequency higher than the average), and thereby decides the elemental images for use in creating the texture atlas (Step S212).

Then, the texture atlas creator 15 creates (re-creates) the texture atlas by using the elemental images selected in Step S212 (Step S213). An algorithm in the event where the texture atlas creator 15 creates the texture atlas may be basically same as the algorithm used by the texture atlas creator 32 of the initial setting device 30 (for example, may be the above-described improved Best-fit method). However, the texture atlas is created by using only the elemental images selected in Step S212, and accordingly, the texture atlas, which is created by the texture atlas creator 15 of the information display controller 10, becomes one, into which those having higher frequencies of display in the past are preferentially incorporated, and becomes one that differs depending on which screen is frequently used by the user.

Figure 23:
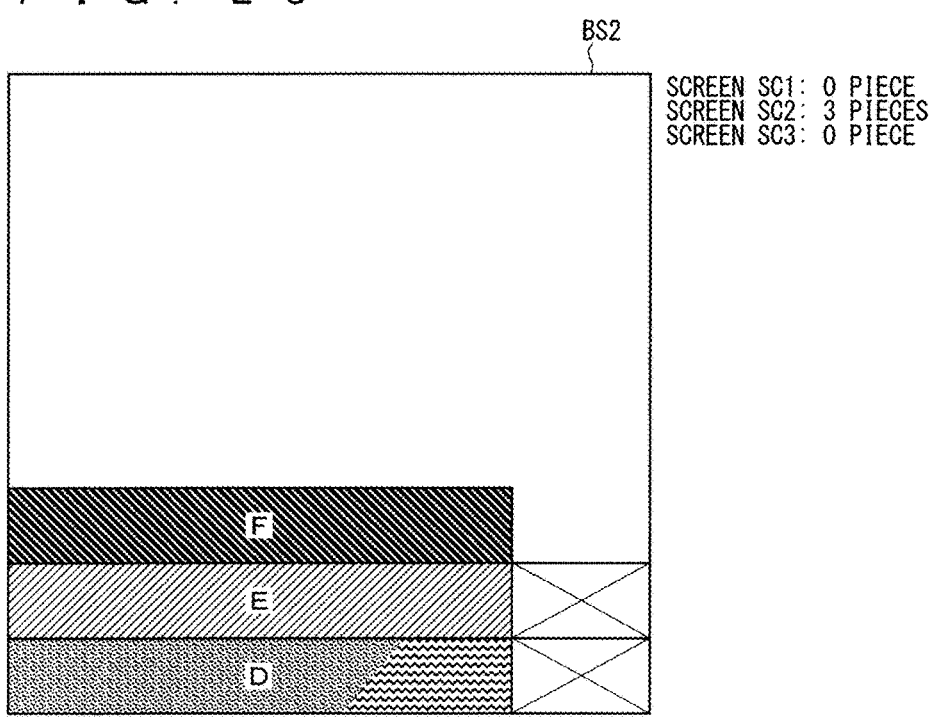
FIG. 23 is a diagram for explaining the creation method of the texture atlas according to the embodiment of the present invention.

For example, in the information display controller 10 that displays the screens SC1 to SC3 shown above, it is assumed that the threshold value of the frequency of display of each elemental image is set to an "average value of the frequencies of display of all the elemental images". At this time, in a case where the frequencies of display of the elemental images D to G which compose the screen SC2 become equal to or lower than the average values of the frequencies of display of the elemental images A to J by a fact that the user hardly allows the screen SC2 to be displayed, then the texture atlas creator 15 creates the texture atlas by using only the elemental images A to C and H to J. In this case, the texture atlas creator 15 creates only the texture atlas of FIG. 17 (the texture atlas of FIG. 23 is not created).

Figure 25:
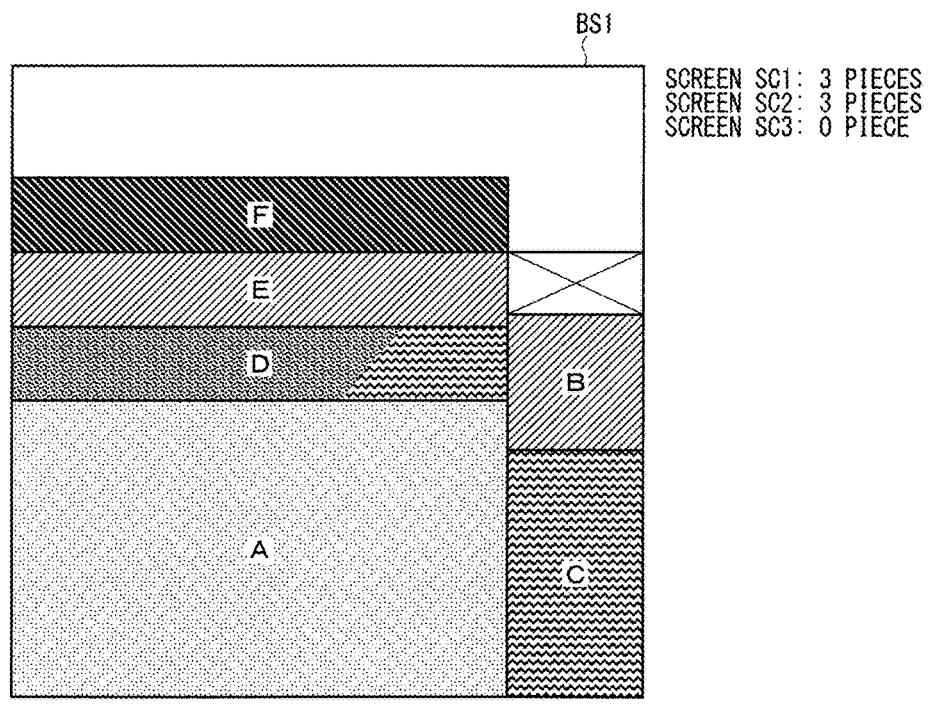
FIG. 25 is a diagram showing an example of a texture atlas created by the information display controller according to the embodiment of the present invention.

Moreover, for example, in a case where the frequencies of display of the elemental images H to J which compose the screen SC3 become equal to or lower than the average values of the frequencies of display of the elemental images A to J by a fact that the user hardly allows the screen SC3 to be displayed, then the texture atlas creator 15 creates the texture atlas by using only the elemental images A to G. In this case, only the texture atlas shown in FIG. 25 is created by the texture atlas creator 15 (the elemental image D and the elemental image G are regarded as the same images, and accordingly, the elemental image G is not arranged on the texture atlas shown in FIG. 25 on the appearance).

As described above, the elemental images for use in creating the texture atlas are limited, whereby the number of texture atlases created at the startup time of the information display controller 10 can be reduced, and this can contribute to the high speeding of the startup. In a case of displaying a screen that uses the elemental images which are not included in the texture atlas, then it is possible that a display speed may decrease; however, the elemental images in which the frequencies of display in the past are high are preferentially incorporated to the texture atlas, and accordingly, it is considered rare that such a screen is displayed, and therefore, convenience for the user is suppressed from decreasing.

The texture atlas created by the texture atlas creator 15 is stored in the texture atlas storage unit 14 (Step S214). When such a new texture atlas is stored in the texture atlas storage unit 14, the controller 19 resets the number of display times of each of the elemental images, which is held in the operation history storage unit 17, and the number of screen transition times and the number of shutdown times, which are stored in the operation history storage unit 17 (Step S215).

When the texture atlas re-creation processing is completed, the processing shifts to Step S203. At this time, the screen constructor 13 constructs the screen by using the texture atlas that is newly created and is stored in the texture atlas storage unit 14.

Modification Example

In the above-described improved Best-fit method, the condition (3c) of STEP3 is defined as:

"(3c): among the rectangles which are not arranged on the base material, the rectangle has a width most approximate to the width of the selected segment."

However, for example, the condition (3c) may be defined as follows:

"(3c): among the rectangles which are not arranged on the base material, the rectangle has a width most approximate to the width of the selected segment, or a width that is 90% or more of the width of the selected segment"; or "(3c): among the rectangles which are not arranged on the base material, the rectangle is a rectangle that has a width most approximate to the width of the selected segment, or is a rectangle that has a width that is 90% or more of a width of the rectangle that has the width most approximate to the width of the selected segment."

In such a way, more rectangles may be allowed to satisfy the condition (3c) ("90%" is an example, and other values may be adopted). In this case, for example, in a case where the width of the selected segment is 100 pixels, and a rectangle with a width of 100 pixels and a rectangle with a width of 90 pixels are present as the rectangles unarranged on the base material, the both thereof satisfy the condition (3c). If more rectangles satisfy the condition (3c), then there increases occasions where the condition (3d) that is the feature of the present invention is applied, and accordingly, the effects of the present invention can be enhanced.

Moreover, in this embodiment, the algorithm according to which the texture atlas creator 15 of the information display controller 10 or the texture atlas creator 32 of the initial setting device 30 creates the texture atlas is one that is made based on the Best-fit method; however, the way of thinking in the present invention is also applicable to the texture atlas creation using other algorithms (for example, other approximate methods of the rectangle packing problem).

That is to say, in the algorithm that takes the size of the elemental image as a reference, when a plurality of candidates for the elemental image to be incorporated into the texture atlas are generated, then an elemental image for composing the screen including more elemental images already arranged in the texture atlas just needs to be preferentially incorporated into the texture atlas.

Note that the present invention is widely applicable to an information display control system commencing with a personal computer; however, is particularly effective in application to a portable or compact device (for example, a smart phone, a tablet terminal, an on-vehicle information display device, a navigation device and the like) in which a resource is limited due to reasons which are manufacturing cost, a size of a product, power consumption and the like.

Moreover, in the present invention, it is possible to appropriately deform and omit the embodiment within the scope of the present invention.

Although the description has been made of the present invention in detail, the above description is an illustration in all aspects, and the present invention is not limited to this. It is interpreted that unillustrated countless modification examples are imaginable without departing from the scope of the present invention.

REFERENCE SIGNS LIST

10: information display controller
11: display processor
12: elemental image storage unit
13: screen constructor
14: texture atlas storage unit
15: texture atlas creator
16: frequency-of-display calculator
17: operation history storage unit
18: texture atlas re-creation condition storage unit
19: controller
21: display
22: operation input device
30: initial setting device
31: elemental image storage unit
32: texture atlas creator
33: texture atlas storage unit
34: texture atlas re-creation condition setting unit
35: output unit

The invention claimed is:

1. An information display control system which switches between displaying one of multiple screens, each screen having a plurality of elemental images of various size, the system comprising:

a processor to execute a program; and
a memory to store the program which, when executed by said processor, performs processes of:
creating a texture atlas in which elemental images associated with one or more of the multiple screens are arranged in accordance with an algorithm that takes as a reference, the size of said plurality of elemental images and the screen associated with each elemental image;
storing said texture atlas;
constructing said multiple screens by extracting associated elemental images from said texture atlas; and
switching between displaying one of the multiple screens based upon a user input,
wherein the algorithm first selects elemental images for the texture atlas based on size and then in an event two or more element images are selected based on size, said processor preferentially incorporates, into said texture atlas, the elemental image associated with a screen for which one or more elemental images have already been incorporated in said texture atlas.

2. The information display control system according to claim 1, wherein said processor further
calculates a past frequency of display of each of said plurality of elemental images,
filters the plurality of elemental images based on their calculated display frequency, and
re-creates said texture atlas by executing said algorithm using the filtered elemental images; and
wherein the filtered elemental images include those element images in which the calculated past frequency of display is higher than a predetermined value.

3. The information display control system according to claim 1, wherein said algorithm further takes as a reference whether two elemental images have a vertically or horizontally reversed relationship, and excludes an elemental image if it is determined that a previously incorporated elemental image has a vertically or horizontally reversed relationship with the elemental image.

4. The information display control system according to claim 1, wherein said processor re-creates said texture atlas using said algorithm when a number of shutdown times of the information display control system or a number of times of the information display control has switched between the display of the multiple screens exceeds a predetermined value.

5. An information display control system which switches between displaying one of multiple screens, each screen having a plurality of elemental images of various size, the system comprising:
a processor to execute a program; and
a memory to store the program which, when executed by said processor, performs processes of:
creating a texture atlas in which elemental images associated with one or more of the multiple screens are arranged in accordance with an algorithm that takes as a reference, the size of said plurality of elemental images and the screen associated with each element image;
storing said texture atlas;
constructing said multiple screens by extracting associated elemental images from said texture atlas; and
switching between displaying one of the multiple screens based upon a user input, wherein said processor
calculates a past frequency of display of each of the plurality of elemental images,
filters the plurality of elemental images based on their calculated display frequency, and
re-creates said texture atlas by executing said algorithm using the filtered elemental images; and
wherein the filtered elemental images include element images, in which the calculated past frequency of display is higher than a predetermined value,
wherein said algorithm further takes as a reference whether two elemental images have a vertically or horizontally reversed relationship, and excludes an elemental image if it is determined that a previously incorporated elemental image has a vertically or horizontally reversed relationship with the elemental image.

6. The information display control system according to claim 5, wherein said processor re-creates said texture atlas using said algorithm when a number of shutdown times of the information display control system or a number of times of the information display control has switched between the display of the multiple screens exceeds a predetermined value.

7. A texture atlas creation method comprising:
acquiring a plurality of elemental images, each elemental image being associated with one or more of a plurality of screens, and
creating a texture atlas in which one or more of said acquired elemental images are arranged in accordance with an algorithm that takes as a reference the size of said acquired elemental images and the screen associated with each acquired elemental image,
wherein, the algorithm first selects element images from the acquired elemental images for incorporation in said texture atlas based on size and then, in an event two or more elemental images are selected based on size, the elemental image associated with a screen for which one or more elemental images have already been incorporated in said texture atlas is incorporated into said texture atlas.

* * * * *